(12) United States Patent
Tatsumi et al.

(10) Patent No.: US 6,592,063 B2
(45) Date of Patent: Jul. 15, 2003

(54) CHUCKING CONFIRMING METHOD

(75) Inventors: Naoki Tatsumi, Tokyo (JP); Kazuya Tamura, Tokyo (JP); Jimmy Zweighaft, Boulder, CO (US)

(73) Assignees: Mitsumi Electric Co., Ltd., Chofu-shi (JP); Benchmark Storage Innovations Inc., Boulder, CO (US)

( * ) Notice: Subject to any disclaimer, the term of this patent is extended or adjusted under 35 U.S.C. 154(b) by 48 days.

(21) Appl. No.: 09/970,044

(22) Filed: Oct. 2, 2001

(65) Prior Publication Data

US 2003/0062437 A1 Apr. 3, 2003

(51) Int. Cl.[7] ............................................. G11B 15/66
(52) U.S. Cl. ................. 242/332.4; 242/338.4; 242/357; 360/95
(58) Field of Search .......... 242/332.4, 332.7, 242/338.4, 357; 360/95

(56) References Cited

U.S. PATENT DOCUMENTS

| 5,414,585 A | 5/1995 | Saliba |
| 5,793,574 A | 8/1998 | Cranson et al. |
| 5,857,634 A | 1/1999 | Hertrich |
| 5,862,014 A | 1/1999 | Nute |

FOREIGN PATENT DOCUMENTS

| JP | 2000-100025 A | 4/2000 |
| JP | 2000-100116 A | 4/2000 |
| JP | 2000-149491 A | 5/2000 |
| WO | WO86/07295 A1 | 12/1986 |
| WO | WO86/07471 A1 | 12/1986 |

*Primary Examiner*—John Q. Nguyen
(74) *Attorney, Agent, or Firm*—Frishauf, Holtz, Goodman & Chick, P.C.

(57) ABSTRACT

A method of confirming that chucking between a supply leader tape (20) and a take-up leader tape (10A) is properly carried out comprises a step of confirming whether or not the chucking is properly carried out and a step of reconfirming whether or not the chucking is properly carried out. The reconfirming step is carried out at least once.

1 Claim, 16 Drawing Sheets

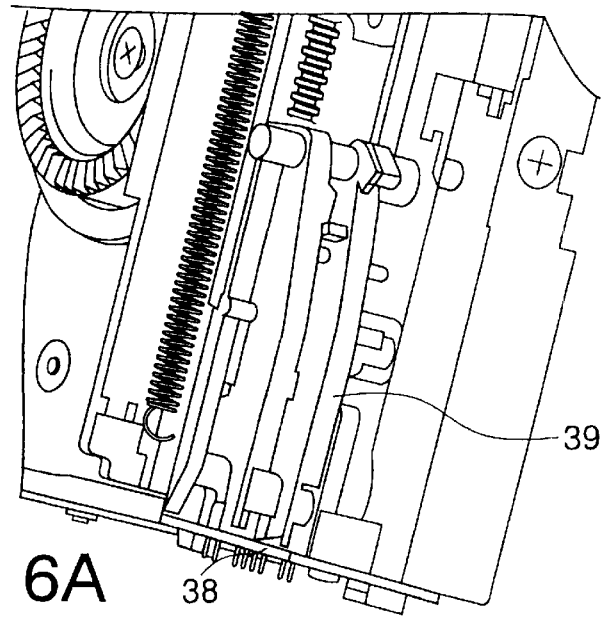
FIG. 6A
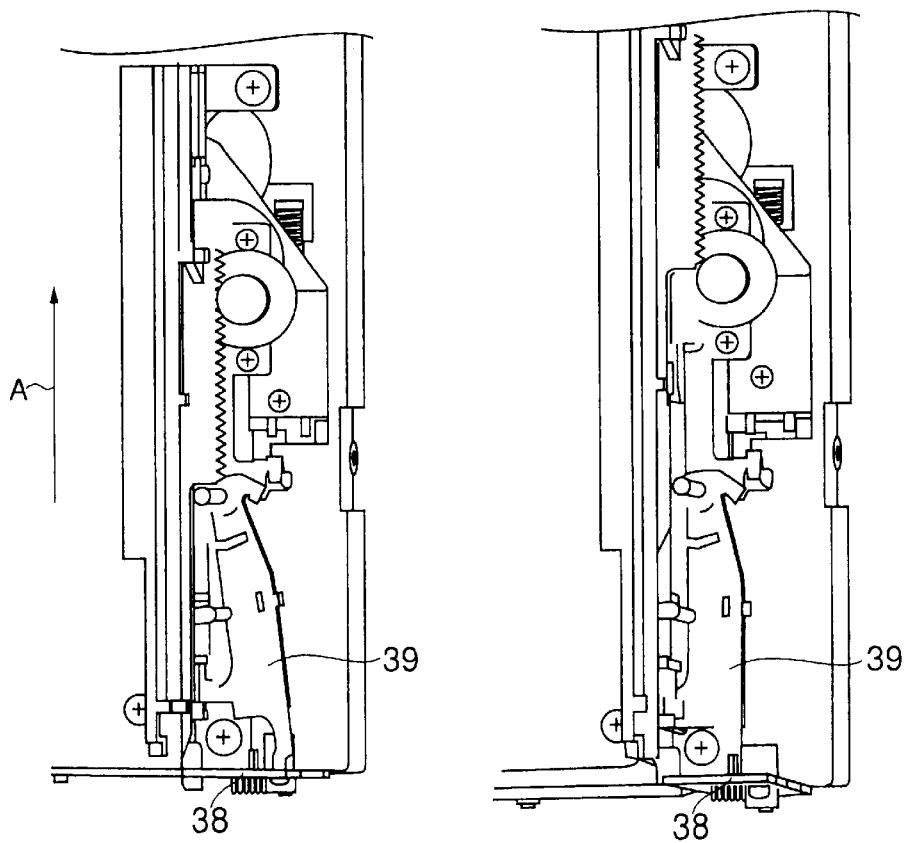
FIG. 6B
FIG. 6C

When no pulse is detected, the torque of T-Reel is increased to pull Leader-Tape towards T Side.

CHUCKING CONFIRMING METHOD

BACKGROUND OF THE INVENTION

This invention relates to a linear tape storage system represented by DLT (Digital Linear Tape) or LTO (Linear Tape Open) and, in particular, to a method of confirming that a supply leader tape drawn out from a tape cassette (tape cartridge) and a take-up leader tape having one end connected to a take-up reel are properly chucked.

A linear tape storage system of the type has been developed as a backup for a computer system. A variety of linear tape storage systems have heretofore been proposed. For example, a digital linear tape drive as the DLT is disclosed in U.S. Pat. No. 5,862,014 or the like.

The digital linear tape drive (hereinafter may simply be called "driving device", "tape drive", or "drive") is adapted to receive a tape cartridge (hereinafter may simply be called "cartridge" or may be called "cassette") having a single reel (supply tape reel) and includes a take-up reel in the interior thereof. When the tape cartridge is loaded in the driving device, a magnetic tape is pulled out from the tape cartridge to be taken up by the take-up reel through a head guide assembly (HGA). The head guide assembly serves to guide to a magnetic head the magnetic tape (hereinafter may simply be called "tape") pulled out from the tape cartridge. The magnetic head exchanges information between it and the tape. Typically, the head guide assembly comprises an aluminum plate having a boomerang-like shape and a plurality of large guide rollers, six in number, comprising bearings.

The head guide assembly is also called a tape guide assembly and is disclosed, for example, in U.S. Pat. No. 5,414,585. An example of the guide roller is disclosed in Japanese Unexamined Patent Publication No. 2000-100025.

As disclosed in U.S. Pat. No. 5,793,574 for example, a tape drive typically comprises a generally rectangular housing having a common base. The base has two spindle motors. The first spindle motor has a spool (take-up reel) permanently mounted to the base and the spool is dimensioned to accept a magnetic tape streaming at a relatively high speed. The second spindle motor is adapted to receive a removable tape cartridge. The removable tape cartridge is manually or automatically inserted into the drive via a slot formed on a housing of the drive. When the tape cartridge is inserted into the slot, the cartridge is engaged with the second spindle motor. Prior to rotation of the first and the second spindle motors, the tape cartridge is connected to the permanently mounted spool by means of a mechanical buckling mechanism. A number of rollers (guide rollers) positioned between the tape cartridge and the permanent spool guide the magnetic tape as it streams at a relatively high speed back and forth between the tape cartridge and the permanently mounted spool.

The digital linear tape drive of the above-mentioned structure requires a pulling device for pulling the tape from the supply tape reel to the take-up reel. Such pulling device is disclosed, for example, in International Publication No. WO86/07471. According to the publication, take-up leader means (first tape leader) is coupled to the take-up reel. To the tape on the supply tape reel, supply tape leader means (second tape leader) is fixed. The first tape leader has a tab formed at its one end. The second tape leader has a locking hole. The tab is engaged with the locking hole. The take-up leader means (first tape leader) may be called a take-up leader tape while the supply tape leader means (second tape leader) may be called a supply leader tape.

Furthermore, a mechanism for joining the first tape leader to the second tape leader is required. Such joining mechanism is disclosed, for example, in International Publication No. WO86/07295.

Japanese Unexamined Patent Publication No. 2000-100116 discloses "Structure of Leader Tape Engaging Part" capable of locking an end of a leader tape (second tape leader) to a tape end hooking part of the tape cartridge without requiring a tab protruding on a lateral side of the leader tape.

U.S. Pat. No. 5,857,634 discloses a lock system for preventing the rotation of the take-up reel of the tape drive when the tape cartridge is not inserted into the drive.

The tape drive further comprises a tape head actuator assembly. The tape head actuator assembly is positioned between the take-up spool and the tape cartridge along a tape path defined by a plurality of rollers. In operation, the magnetic tape streams back and forth between the take-up spool and the tape cartridge, coming into close proximity to the head actuator assembly while streaming along the defined tape path. An example of the magnetic head actuator assembly is disclosed in U.S. Pat. No. 5,793,574 mentioned above.

On the other hand, as the tape cartridge to be received in the digital linear tape drive, one example is disclosed in Japanese Unexamined Patent Publication No. 2000-149491.

As described above, when the tape cartridge (cassette) is loaded in the tape drive, it is necessary for the take-up reel to pull the tape from the supply tape reel of the tape cartridge. To this end, the supply leader tape must be caught by the take-up leader tape. Such catching operation is called "chucking". The chucking is carried out by the use of a buckle.

FIG. 1 shows a take-up leader tape 10 connected to a take-up reel. FIG. 2 shows a supply leader tape 20 fixed to a tape on the supply tape reel.

As illustrated in FIG. 1, the take-up leader tape 10 has one end formed into an enlarged tab 12 supported by a stem portion 11. Near to the enlarged tab 12, a positioning hole 13 is formed. To the positioning hole 13, a finger-like protrusion of a buckle, which will later be described, is fitted. On the other hand, as illustrated in FIG. 2, the supply leader tape 20 has a locking hole 21 formed at its one end. By engaging the tab 12 with the locking hole 21, the chucking is carried out.

Referring to FIG. 3, description will be made of the structure of a tape drive. FIG. 3 is a perspective view of the tape drive illustrated in the state where an upper cover is removed.

The tape drive 30 is adapted to receive a tape cartridge (not shown) and includes a take-up reel 31 in the interior thereof. The take-up reel 31 may be called a spool. The tape drive 30 comprises a generally rectangular housing (gear chassis) 32 having a common base 32a. The base 32a has two spindle motors (reel motors) 33 and 34. The first spindle motor 33 has the spool (take-up reel) 31 permanently mounted to the base 32a. The spool 31 is dimensioned to accept a magnetic tape (not shown) streaming at a relatively high speed. The first spindle motor 33 may be called a take-up reel motor. The second spindle motor 34 is adapted to receive the removable cartridge (not shown). The second spindle motor 34 may be called a supply reel motor. The removable cartridge is manually or automatically inserted into the drive 30 via a slot 32b formed on the housing 32 of the drive 30 along an inserting direction depicted by an arrow A.

When the tape cartridge is inserted into the slot 32b, the cartridge is engaged with the second spindle motor (supply reel motor) 34 by a loading mechanism which will later be described. Prior to rotation of the first and the second spindle motors 33 and 34, the tape cartridge is connected to the permanently mounted spool 31 by means of a mechanical buckle 35. A number of rollers (guide rollers) 36 positioned between the tape cartridge and the permanent spool 31 guide the magnetic tape as it streams at a relatively high speed back and forth between the tape cartridge and the permanently mounted spool 31. The housing 32 comprises a sheet metal chassis made of an iron-based magnetic material.

The tape drive 30 further comprises a magnetic tape head actuator assembly (hereinafter may simply be called "actuator assembly") 40. The actuator assembly 40 is positioned between the take-up spool 31 and the tape cartridge along a tape path (not shown) defined by the rollers 36. In operation, the magnetic tape streams back and forth between the take-up spool 31 and the tape cartridge, coming into close proximity to the actuator assembly 40 while streaming along the defined tape path.

As illustrated in FIG. 4 also, one of the guide rollers 36 is provided with an encoder 37 attached thereto. By the phase of pulses produced by the encoder 37, it is possible to know whether the guide rollers 36 perform forward rotation or reverse rotation. It is noted here that the forward rotation means the rotation in a direction in which the magnetic tape is taken up by the take-up reel 31 while the reverse rotation means the rotation in a direction in which the magnetic tape is drawn out from the take-up reel 31, i.e., a direction in which the magnetic tape is rewound.

FIG. 5 shows the state in which a finger-like protrusion 351 of the buckle 35 is fitted to the positioning hole 13 (FIG. 1) of the take-up leader tape 10.

Referring to FIGS. 6A to 6C in addition to FIG. 3, the tape drive 30 comprises a cassette-in switch 38 operable in cooperation with an eject mechanism mounted to its right-hand side surface (receiver right). FIG. 6A is a perspective view showing a mounting position of the cassette-in switch 38, FIG. 6B is a view showing the state where the tape cartridge is ejected from the tape drive 30, and FIG. 6C is a view showing the state where the tape cartridge is inserted into the tape drive 30 (cassette-in state).

As illustrated in FIG. 6B, in an ejected state, a cassette-in switch lever 39 is separated from the cassette-in switch 38 and the cassette-in switch 38 is turned off. When the tape cartridge is inserted into the tape drive 30, the cassette-in switch lever 39 comes into close proximity to the cassette-in switch 38 as illustrated in FIG. 6C so that the cassette-in switch 38 is turned on.

As illustrated in FIG. 3, the tape drive 30 further comprises a mode motor 45. The mode motor 45 serves to drive a loading mechanism which will later be described, and controls up/down movement of a cartridge driver (reel driver). The mode motor 45 also controls a locked state and a released state of the buckle 35.

Referring to FIGS. 7 through 10, description will be made of the loading mechanism. FIG. 7 is an exploded perspective view of the loading mechanism 100 as seen from a back surface (lower surface). FIG. 8 is an exploded perspective view of the tape drive 30 including the loading mechanism (however, the loading mechanism itself is not illustrated) illustrated in FIG. 1 as seen from a top surface (upper surface). FIG. 9 is a sectional view of the loading mechanism 100 in an enlarged scale in the state where a drive gear is retracted and FIG. 10 is a sectional view of the loading mechanism in an enlarged scale in the state where the drive gear is operated.

The tape drive 30 comprises a chassis 32 having an upper surface 32U and a lower surface 32L. The chassis 32 comprises a sheet metal chassis made of an iron-based magnetic material. The chassis 32 is provided with an opening 32a1. The opening 32a1 has a cylindrical shape formed by bending a part of the chassis 32 downward.

As illustrated in FIG. 8, the supply reel motor 34 includes a rotor 62 and a stator 63 mounted on an upper surface of a motor board 61. The rotor 62 comprises a magnet 621 exposed outward.

The supply reel motor 34 has a rotation shaft 611 fixed to the motor board 61 and vertically standing up from its approximate center. Around the rotation shaft 611, the rotor 62 is rotatably supported through a ball bearing 612. Specifically, the rotor 62 comprises a cylindrical rotation member 622 attached to the ball bearing 612, a dish-like rotation member 623 extending from a lower end of the cylindrical rotation member 622 in a direction perpendicular to an extending direction of the rotation shaft 611 and having an outer peripheral end portion perpendicularly bent upward, and a ring-shaped magnet 621 fixedly attached to an outer peripheral surface of the outer peripheral end portion of the dish-like rotation member 623.

On the other hand, the stator 63 is mounted on the motor board 61 in the vicinity of an outer peripheral side of the magnet 621 and, as illustrated in FIG. 8, comprises a plurality of radially extending stator cores and a plurality of stator coils wound around the stator cores, respectively.

The loading mechanism 100 is arranged between the supply reel motor 34 and the lower surface 32L of the chassis 32.

The loading mechanism 100 comprises a drive hub 110 fixed and mounted on an upper end of the cylindrical rotation member 622 of the rotor 62 by three screws 101 as illustrated in FIG. 3. The drive hub 110 has a generally annular shape and has an outer peripheral end bent downward. Specifically, the drive hub 110 has an annular portion 111 extending in parallel to the motor board 61 and fixed to the upper end of the cylindrical rotation member 622 and a cylindrical portion 112 perpendicularly bent downward from an outer peripheral end of the annular portion 111. The cylindrical portion 112 has an outer peripheral wall provided with three grooves 112 (although only one is illustrated in FIG. 7) formed at an interval of 120° and extending in a vertical direction (i.e., the extending direction of the rotation shaft 611). The cylindrical portion 112 has a lower end provided with three engaging holes 112b (although two of them are illustrated in FIG. 7) formed at an interval of 120° and interposed between the three grooves 112a.

A drive gear 120 is located at an outer periphery of the drive hub 110. The drive gear 120 may be called a reel driver or a cartridge driver. The drive gear 120 has an inner cylindrical portion 121, an outer cylindrical portion 122 spaced from the inner cylindrical portion 121 by a predetermined distance, and an annular portion 123 connecting the inner cylindrical portion 121 and the outer cylindrical portion 122 at their upper ends. Thus, the drive gear 120 has a cylindrical groove 120a defined between the inner cylindrical portion 121 and the outer cylindrical portion 122. When the drive gear 120 is moved upward as illustrated in FIG. 10, the annular portion 123 is engaged with a reel hub (supply tape reel) of the cartridge. In the cylindrical groove 120a, a spring 130 is arranged. The spring 130 continuously urges the drive gear 120 upward. The inner cylindrical portion 121 has an inner peripheral wall provided with three rod-like protrusions 121a (only one being illustrated in FIG. 7) inserted into the three grooves 112a of the drive hub 110 and extending in the vertical direction. The drive gear 120 further comprises an inner annular flange 124 formed at a lower end of the inner cylindrical portion 121 to protrude inward and an outer annular flange 125 formed at a lower end of the outer cylindrical portion 122 to protrude outward. The inner annular flange 124 has an upper end provided with three engaging protrusions 124a (although only one is illustrated in FIG. 7) formed at positions corresponding to the three engaging holes 112b of the drive hub 110. Therefore, when the drive gear 120 is moved upward as illustrated in FIG. 10, the three engaging protrusions 124a are engaged with the three engaging grooves 112a of the drive hub 110.

In the loading mechanism 100, the drive gear 120 is retracted within the opening 32a1 as illustrated in FIG. 9 in an unoperated state and protrudes upward from the lower surface 32L of the chassis 32 as illustrated in FIG. 10 in an operated state. This means that the loading mechanism 100 comprises an elevation control mechanism (which will later be described in detail) for controlling an elevating movement of the drive gear 120. Briefly speaking, in the unoperated state of the loading mechanism 100, the elevation control mechanism carries out control so that the drive gear 120 is located downward against the urging force of the spring 130 to put the drive gear 120 in a retracted state as illustrated in FIG. 9. On the other hand, in the operated state of the loading mechanism 100, the elevation control mechanism carries out control so that the drive gear 120 is located upward as illustrated in FIG. 10 by the use of the urging force of the spring 130.

Next, description will be made in detail about the elevation control mechanism used in the loading mechanism 100.

The elevation control mechanism comprises a ring cam 140 rotatably arranged around the rotation shaft 611 so as to cover the stator 63 of the supply reel motor 34, the magnet 621 of the rotor 62, and the outer peripheral portion of the dish-like rotation member 623. The ring cam 140 may be called a cam gear. More in detail, the ring cam 140 comprises an annular member 141 spaced from upper surfaces of the stator 63, the magnet 621 of the rotor, and the outer peripheral end portion of the dish-like rotation member 623 by a predetermined distance so as to cover these upper surfaces, an inner-periphery cylindrical member 142 perpendicularly bent downward from an inner peripheral edge of the annular member 141 and spaced from the dish-like rotation member 623 of the rotor 62 by a predetermined distance, and an outer-periphery cylindrical member 143 perpendicularly bent downward from an outer peripheral edge of the annular member 141 and spaced from an outer peripheral edge of the stator 63 by a predetermined distance. The outer-periphery cylindrical member 143 is provided with a gear portion (not shown) formed at a part thereof to be engaged with a gear which is not illustrated. The gear which is not illustrated is engaged with the mode motor 45 (FIG. 3). Therefore, the ring cam 140 is rotatably driven by the mode motor 45. The inner-periphery cylindrical member 142 has an inner peripheral wall provided with three engaging grooves 142a (although two of them are illustrated in FIG. 7) obliquely extending from its lower end to its upper end, as illustrated in FIG. 7. The three engaging grooves 142a are located at an angular interval of 120° from one another to be rotationally or radially symmetrical with respect to the rotation shaft 611.

The annular member 141 of the ring cam 140 is provided with three arc-shaped openings 141a symmetrically formed around the rotation shaft 611 at an equiangular interval of 120°. On the other hand, the lower surface 32L of the chassis 32 is provided with three pins 145 formed at positions corresponding to the three arc-shaped openings 141 a and symmetrically arranged at an equiangular interval of 120°. The three pins 145 are inserted into the three arc-shaped openings 141a corresponding thereto, respectively.

As described above, in order to form the cylindrical opening 32a1, the upper surface 32U of the chassis 32 is bent downward to constitute a cylindrical member 150. In other words, the cylindrical member 150 is formed by the use of a part of the chassis 32. The cylindrical member 150 has a function similar to that of a ring cam pivot. In detail, the cylindrical member 150 is located in the vicinity of the inner peripheral wall of the inner-periphery cylindrical member 142 of the ring cam 140. The cylindrical member 150 is provided with three slits (guide holes) 150a formed at an equiangular interval of 120° and extending long in the vertical direction parallel to the rotation shaft 611.

A drive ring 160 is disposed in frictional contact with an inner peripheral wall of the cylindrical member 150 to be movable up and down (elevatable). To the drive ring 160, three rod-like pins 161 (although two of them are illustrated in FIG. 7) are attached at positions corresponding to the above-mentioned three guide holes 150a and extending outward in a radius direction (radial direction) at an equiangular interval of 120°. The three pins 161 has radially outward ends engaged with the three engaging grooves 142a formed on the inner-periphery cylindrical member 142 of the ring cam 140, respectively.

As illustrated in FIG. 9, the three pins 161 are located near lower ends of the three engaging grooves 142a when the drive gear 120 is retracted in the opening 32a1. On the other hand, as illustrated in FIG. 10, the three pins 161 are located near upper ends of the three engaging grooves 142a when the drive gear 120 is operated.

The drive ring 160 has a hook portion 162 having an L-shaped section and protruding radially inward from its upper end. The hook portion 162 is engaged with the outer annular flange 125 of the drive gear 120. Thus, it will be understood that the position of the drive gear 120 is controlled by the position of the drive ring 160.

On the other hand, the buckle 35 has an engaging portion (which will later be described) to be engaged with a cam portion of the ring cam 140. Depending upon a rotating position of the ring cam 140, the buckle 35 is put into a locked state or a released state.

Although not illustrated in the figure, the tape drive 30 has a take-up reel rotation sensor for detecting the rotation of the take-up reel 31 to produce a pulse signal, and a supply tape reel rotation sensor for detecting the rotation of the supply tape reel (not shown) of the tape cartridge to produce a pulse signal.

In the tape drive 30, the supply leader tape 20 (FIG. 2) must be chucked with the take-up leader tape 10 (FIG. 1), as described above. As a technique of confirming that the chucking is properly performed, use has presently been made of two chucking confirming methods which will hereinafter be described.

At first referring to FIGS. 11, 12A, and 12B, the first existing chucking confirming method will be described. FIG. 11 is a timing chart for describing the first existing chucking confirming method and FIGS. 12A and 12B are views illustrating a positional relationship of the buckle for describing the first existing chucking confirming method.

In FIG. 11, a top (first) line represents the state of the cassette-in switch 38. A second line represents the rotation state of the mode motor 45. A third line represents the elevation state of the cartridge driver 120. A fourth line represents the state of the buckle 35. A fifth line represents pulses produced by the supply tape reel rotation sensor. A sixth (last) line represents pulses produced by the take-up reel rotation sensor.

FIG. 12A shows the chucking state between the supply leader tape 20 and the take-up leader tape 10 immediately after the tape cartridge is inserted into the tape drive 30. FIG. 12B shows the position where the chucking is confirmed. The buckle 35 has the finger-like protrusion 351 to be fitted into the positioning hole 13 (FIG. 1) of the take-up leader tape 10 and an engaging portion 352 to be engaged with the cam portion (not shown) of the cam gear 140.

When the tape cartridge is loaded in the tape drive 30, the cassette-in switch 38 is turned from an off state (FIG. 6B) into an on state (FIG. 6C) (see the first line in FIG. 11). In response to the on state of the cassette-in switch 38, a control unit which is not illustrated in the figure makes the mode motor 45 rotate for 0.7 second (see the second line in FIG. 11). In response to the rotation of the mode motor 45, the cam gear 140 is rotated so that the cartridge driver 120 is slightly moved upward. At this time, as illustrated in FIG. 12A, the engaging portion 352 of the buckle 35 is not engaged with the cam portion of the cam gear 140 and the finger-like protrusion 351 of the buckle 35 is fitted into the positioning hole 13 of the take-up leader tape 10 (locked state). By a buckle arm which is not illustrated in the figure, the tab (FIG. 1) of the take-up leader tape 10 is engaged with the locking hole 21 (FIG. 2) of the supply leader tape 20 to bring the end portion of the take-up leader tape 10 in engagement with the supply leader tape 20.

The control unit stops the mode motor 45 for a predetermined time interval and thereafter rotates the mode motor 45 again (see the second line in FIG. 11). Following the rotation of the mode motor 45, the cartridge driver 120 is further moved upward. Simultaneously, the engaging portion of the buckle 35 is engaged with the cam portion of the cam gear 140 to rotate the buckle 35 clockwise. Consequently, the positioning hole 13 of the take-up leader tape 10 is disengaged (released) from the finger-like protrusion 351 of the buckle 35 (FIG. 12B).

Thereafter, the control unit rotatably drives the take-up reel motor 33 in a tape take-up direction. In case where the supply leader tape 20 (FIG. 2) is properly chucked with the take-up leader tape 10 (FIG. 1), the pulses are produced from both of the supply tape reel rotation sensor and the take-up reel rotation sensor, as illustrated in the fifth and the sixth lines in FIG. 11. Therefore, by detecting both of these pulses, it is possible to confirm that the chucking has properly been carried out.

On the other hand, in case where the supply leader tape 20 (FIG. 2) is not properly chucked with the take-up leader tape 10 (FIG. 1), the positioning hole 13 of the take-up leader tape 10 is not released from the finger-like protrusion 351 of the buckle 35. As a result, even if the take-up reel motor 33 is rotatabaly driven in the tape take-up direction, no pulse is produced from the supply tape reel rotation sensor. Thus, the control unit can detect that the chucking has not properly been carried out.

Next referring to FIGS. 13, 14A and 14B, description will be made of the second existing chucking confirming method. FIG. 13 is a timing chart for describing the second existing chucking confirming method and FIGS. 14A and 14B are views showing a positional relationship of the buckle for describing the second existing chucking confirming method.

In FIG. 13, a top (first) line represents the state of the cassette-in switch 38. A second line represents the rotation state of the mode motor 45. A third line represents the elevation state of the cartridge driver 120. A fourth line represents the state of the buckle 35. A fifth line represents a torque of the supply reel motor 34 for driving and rotating the supply reel. A sixth line represents a torque of the take-up reel-motor 33 for driving and rotating the take-up reel 31. A seventh line represents pulses (forward rotation pulses) produced by the encoder 37 when the guide rollers 36 perform the forward rotation. An eighth line represents pulses (reverse rotation pulses) produced by the encoder 37 when the guide rollers 36 perform the reverse rotation.

FIG. 14A shows the state where the take-up leader tape 10 is not separated although the buckle 35 is operated. FIG. 14B shows the state where the take-up leader tape 10 is disengaged from the buckle 35 (released state) when the torque of the supply reel becomes greater than the torque of the take-up reel 31. It is noted here that the chucking state between the supply leader tape 20 and the take-up leader tape 10 immediately after the tape cartridge is inserted into the tape drive 30 is similar to that illustrated in FIG. 12A.

When the tape cartridge is loaded into the tape drive 30, the cassette-in switch 38 is turned from the off state (FIG. 6B) into the on state (FIG. 6C) (see the first line in FIG. 13). In response to the on state of the cassette-in switch 38, the control unit which is not illustrated in the figure makes the mode motor 45 rotate for 0.7 second (see the second line in FIG. 13). In response to the rotation of the mode motor 45, the cam gear 140 is rotated so that the cartridge driver 120 is slightly moved upward. At this time, as illustrated in FIG. 12A, the engaging portion 352 of the buckle 35 is not engaged with the cam portion of the cam gear 140 and the finger-like protrusion 351 of the buckle 35 is fitted into the positioning hole 13 of the take-up leader tape 10. By the buckle arm which is not illustrated in the figure, the tab (FIG. 1) of the take-up leader tape 10 is engaged with the locking hole 21 (FIG. 2) of the supply leader tape 20 to bring the end portion of the take-up leader tape 10 in engagement with the supply leader tape 20.

The above-mentioned operation is similar to that of the first existing chucking confirming method described above.

Next, the control unit rotatably drives the supply reel motor 34 at a low torque and the take-up reel motor 33 at a high torque (see the fifth and the sixth lines in FIG. 13). In other words, the tape is applied with back tension. As a consequence, the slack of the supply leader tape 20 is removed.

In this state, the control unit stops the mode motor 45 for a predetermined time interval and thereafter rotates the mode motor 45 again (see the second line in FIG. 13). Following the rotation of the mode motor 45, the cartridge driver 120 is elevated. Simultaneously, the engaging portion of the buckle 35 is engaged with the cam portion of the cam gear 140 so that the buckle 35 is rotated (driven) clockwise (see the fourth line in FIG. 13). At this time, inasmuch as the supply reel is given the torque weaker than that of the take-up reel 31, the supply leader tape 20 (FIG. 2) is pulled out from the tape cartridge. Inasmuch as both of the supply reel and the take-up reel are driven prior to the mode motor 45, the take-up leader tape 10 is not released from the buckle 35. This state is illustrated in FIG. 14A. At this time, the encoder 37 produces the forward rotation pulses (see the seventh line in FIG. 13).

Subsequently, the control unit drives the supply reel motor 34 at a torque stronger than that of the take-up reel motor 33 for a predetermined time interval (see the fifth and the sixth lines in FIG. 13). As a consequence, the supply leader tape 20 is taken up (rewound) by the supply reel so that the take-up leader tape 10 is released from the buckle 35. This state is illustrated in FIG. 14B. If the chucking is properly carried out, the encoder 37 produces the reverse rotation pulses (see the eighth line in FIG. 13). Thus, the control unit can confirm that the chucking is properly carried out by detecting the reverse rotation pulses.

After the above-mentioned confirmation, the control unit rotatably drives the supply reel motor 34 at a low torque and the take-up reel motor 33 at a high torque (see the fifth and the sixth lines in FIG. 13) so that the tape is taken up by the take-up reel 31 while the tape is applied with the back tension.

In case where the supply leader tape 20 (FIG. 2) is not properly chucked with the take-up leader tape 10 (FIG. 1), the reverse rotation pulses (the eighth line in FIG. 13) are not detected. Thus, the control unit can detect that the chucking has not properly been carried out.

In any event, each of the first and the second existing chucking confirming methods confirms, only once, whether or not the chucking is properly carried out, as described above.

However, the first and the second existing chucking confirming methods mentioned above are disadvantageous in the following respects.

In the first existing chucking confirming method, if the supply leader tape 20 (FIG. 2) is torn off, the take-up leader tape 10 (FIG. 1) is disengaged from the buckle 35 and retry is impossible. In addition, the take-up reel motor 33 and the mode motor 45 are driven under time control, as described above. Therefore, drive timings for the buckle 35 and the take-up reel motor 33 may possibly be improper. For example, in a particular design (mechanism) of the tape drive 30, the rotation of the mode motor 45 may drive the buckle 35 in a releasing direction within 0.7 second as depicted by a broken line in the fourth line of FIG. 11. In such a mechanism also, the take-up leader tape 10 (FIG. 1) is disengaged from the buckle 35 and the retry is impossible.

In the second existing chucking confirming method, it is assumed that the supply leader tape 20 (FIG. 2) is torn off or that only one of the protrusions of the tab 12 of the take-up leader tape 10 is engaged with (inserted in) the locking hole 21 of the supply leader tape 20. In this state also, the forward and the reverse rotation pulses are produced by the encoder 37 in the second existing chucking confirming method. However, in such a state, when the supply reel motor 34 is driven at a torque stronger than that of the take-up reel motor 33, the chucking is released. As a result, like in the first chucking confirming method mentioned above, the retry is impossible.

SUMMARY OF THE INVENTION

It is therefore an object of this invention to provide a chucking confirming method capable of reliably detecting mis-chucking.

It is another object of this invention to provide a chucking confirming method enabling retry even if chucking is released.

According to this invention, there is provided a method of confirming, upon chucking a supply leader tape (20) and a take-up leader tape (10A) when a cartridge is inserted into a drive (30), that the chucking is properly carried out, the chucking being carried out by the use of a buckle (35) having a finger-like protrusion (351) to be fitted to a positioning hole (13A) of the take-up leader tape and by engaging a tab (11) of the take-up leader tape having one end connected to a take-up reel (31) with a locking hole (21) of the supply leader tape drawn out from the cartridge, the method comprising the steps of confirming whether or not the chucking is properly carried out and reconfirming whether or not the chucking is properly carried out, the reconfirming step being carried out at least once, the confirming step including the steps of completely elevating a cartridge driver (120) after the cartridge is inserted into the drive to engage the cartridge driver with a supply tape reel in the cartridge; judging, with reference to position detection signals from first and second sensors (51, 52), that the cartridge driver is completely elevated; driving the buckle from a locked state into a half state where the finger-like protrusion is kept fitted into the positioning hole and simultaneously driving a supply reel motor (34) and a take-up reel motor (33) with the supply tape reel given a torque lower than that of the take-up reel so that the supply leader tape and the take-up leader tape are applied with back tension to thereby remove the slack of the supply leader tape; judging, with reference to other position detection signals from the first and the second sensors, that the buckle reaches the above-mentioned half state; and driving the supply reel motor and the take-up reel motor with the supply tape reel given a torque higher than that of the take-up reel to move the supply leader tape and the tape-up leader tape in a rewinding direction; the reconfirming step including the steps of driving, after rewinding direction pulses are detected from an encoder (37) when the supply leader tape and the take-up leader tape are moved in the rewinding direction, the supply reel motor and the take-up reel motor with the supply tape reel given a torque lower than that of the take-up reel to move the supply leader tape and the take-up leader tape in a take-up direction, and driving, after take-up direction pulses are detected from the encoder (37) when the supply leader tape and the take-up leader tape are moved in the take-up direction, the supply reel motor and the tape-up reel motor with the supply tape reel given a torque higher than that of the take-up reel to move the supply leader tape and the take-up leader take in the rewinding direction; the method further comprising the step of driving, after reconfirming in the reconfirming step that the chucking is properly carried out, the buckle from the half state to a released state where the take-up leader tape is released and simultaneously driving the supply reel motor and the take-up reel motor to carry out take-up operation with the supply tape reel given a torque lower than that of the take-up reel so that the supply leader tape and the take-up leader tape are applied with back tension; the positioning hole (13A) of the take-up leader tape being an elongated hole such that, when the buckle is in the half state, the supply leader tape and the take-up leader tape are allowed to be moved in the rewinding direction and the take-up direction.

It will readily be understood that the reference numerals enclosed in parentheses are affixed to facilitate understanding of this invention and no more than mere examples and that this invention is not restricted thereto.

BRIEF DESCRIPTION OF THE DRAWING

FIG. 6A is a perspective view showing a cassette-in switch used in the tape cartridge illustrated in FIG. 3 and its surroundings;

FIGS. 6B and 6C are views for describing an operation of the cassette-in switch illustrated in FIG. 6A;

Figure 1:
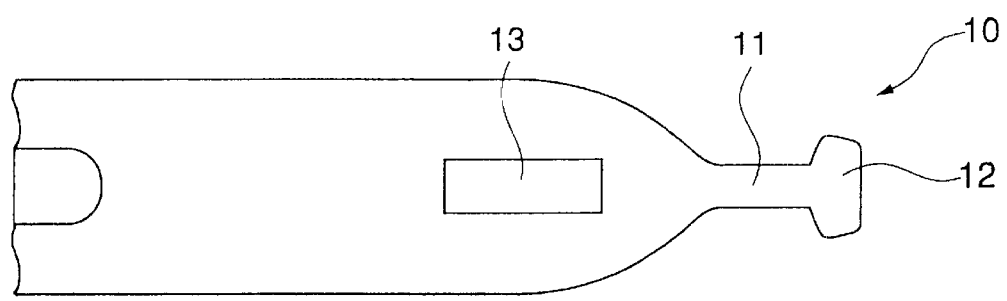
FIG. 1 is a plan view showing an end portion of an existing take-up leader tape used in a tape drive.

DESCRIPTION OF THE PREFERRED EMBODIMENT:

Now, description will be made in detail about an embodiment of this invention with reference to the drawing.

Figure 15:
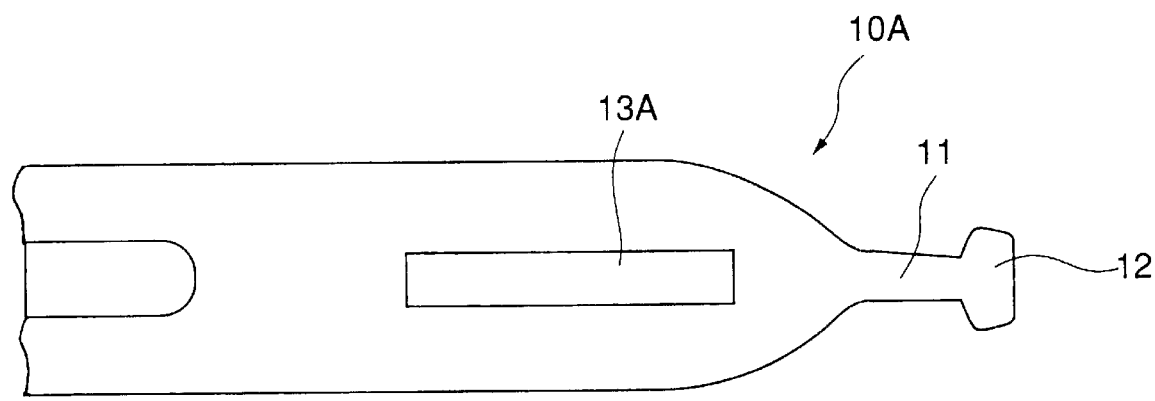
FIG. 15 is a plan view showing an end portion of a take-up leader tape used to implement a chucking confirming method according to this invention.

At first referring to FIG. 15, description will be made of a take-up leader tape 10A required to implement a chucking confirming method according to this invention. The illustrated take-up leader tape 10A is similar in structure to the positioning hole 13 illustrated in FIG. 1 except that a positioning hole 13A to be fitted to a finger-like protrusion 351 of a buckle 35 is longer in a longitudinal direction than the positioning hole 13 illustrated in FIG. 1. Thus, the positioning hole 13A is formed as a relatively long hole in order to allow the take-up leader tape 10A to run in forward and reverse directions as will later be described.

Figure 16:
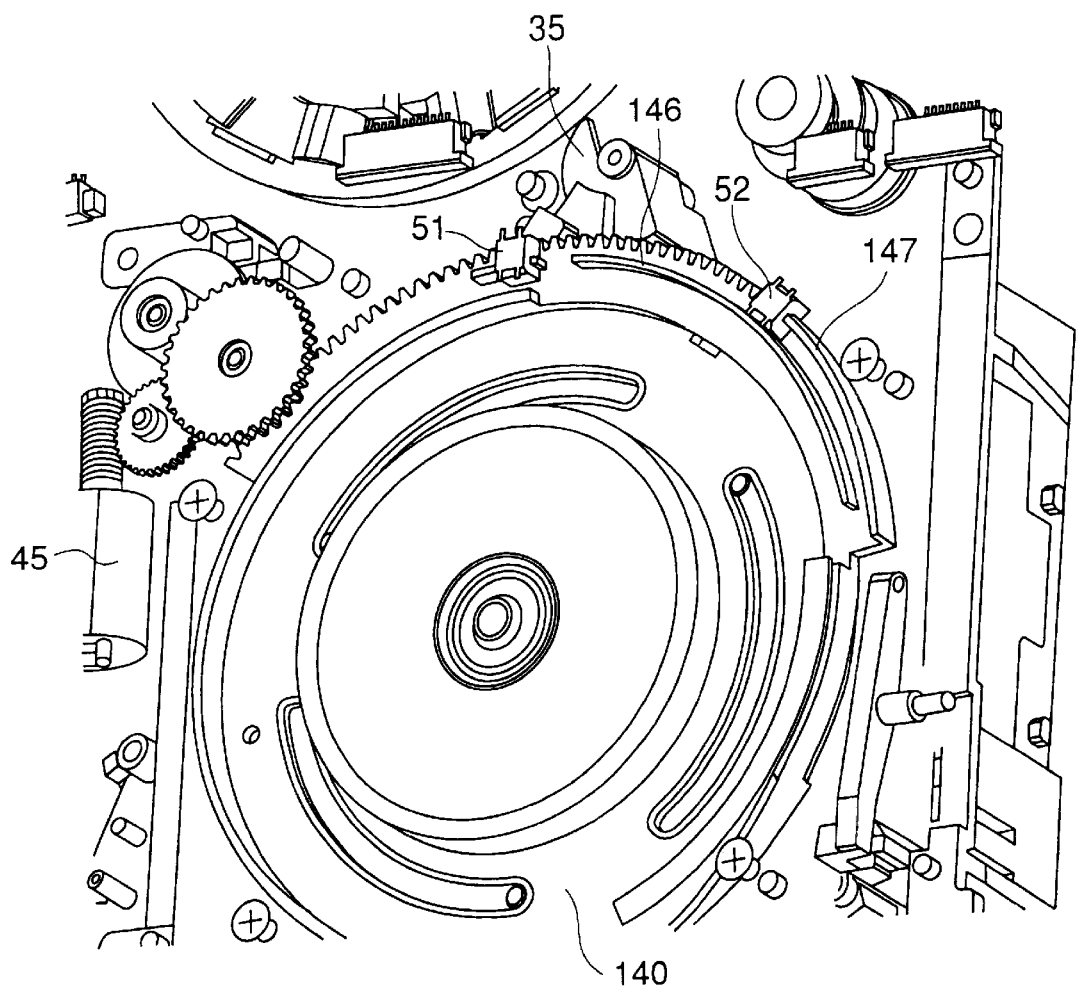
FIG. 16 is a perspective view showing a mounting state of sensors (photo interrupters) for detecting a rotating position of a cam gear and required to implement the chucking confirming method according to this invention.

Next referring to FIG. 16, description will be made of first and second sensors (photo interrupters) 51 and 52 for detecting a rotating position of a cam gear (ring cam) 140A and required to implement the chucking confirming method according to this invention. The first and the second sensors 51 and 52 are mounted on a motor board 61 of a supply reel motor 34.

The ring cam 140A has a back surface provided with first and second arc-shaped shielding plates 146 and 147 for controlling on/off (open/close) of the first and the second sensors 51 and 52, respectively. The first sensor 51 serves to detect the state where a cartridge driver 120 is completely elevated. The second sensor 52 serves to detect that the buckle 35 is in a half state between a locked state and a released state.

Figure 3:
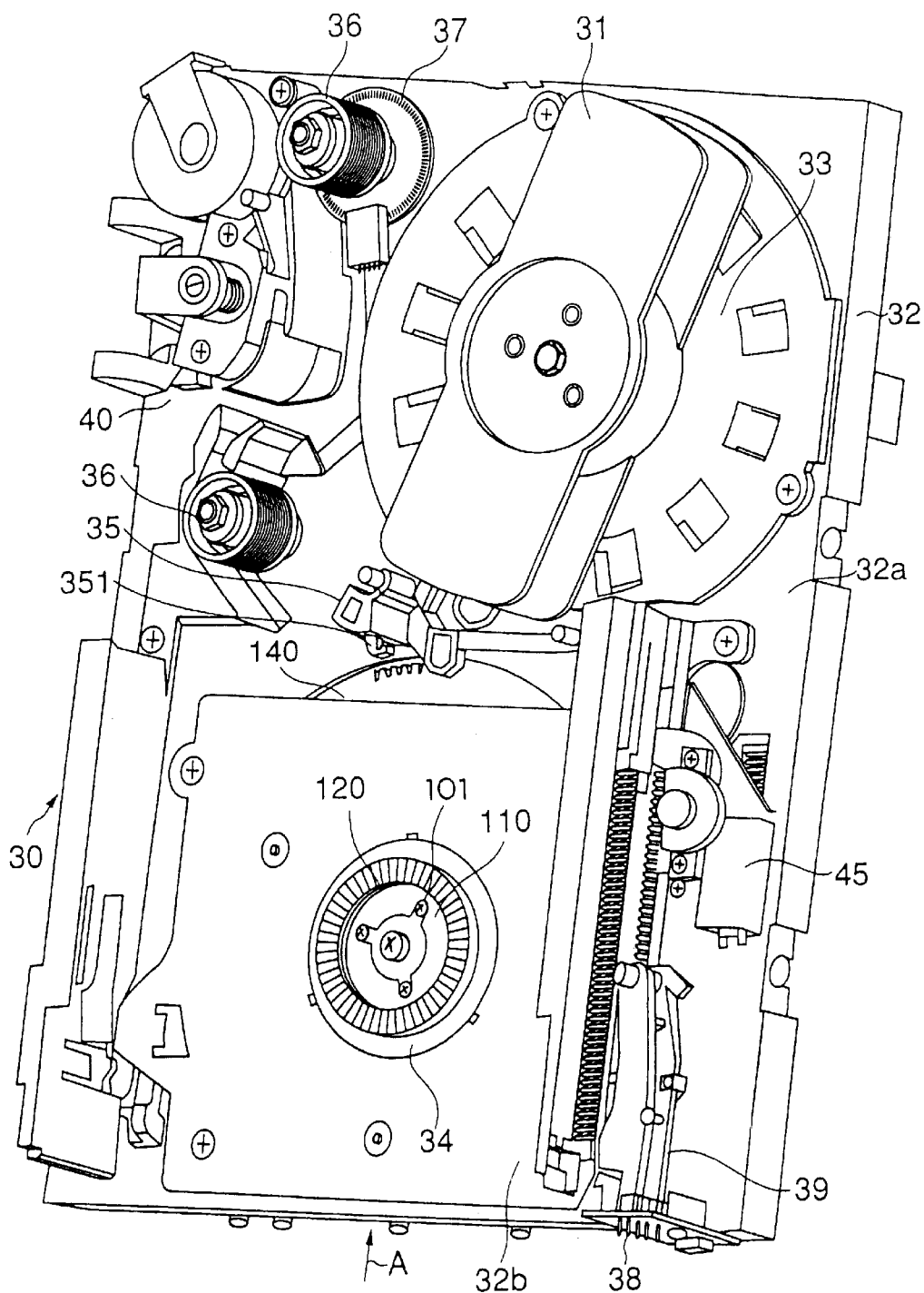
FIG. 3 is a perspective view showing the structure of the tape drive.
Figure 4:
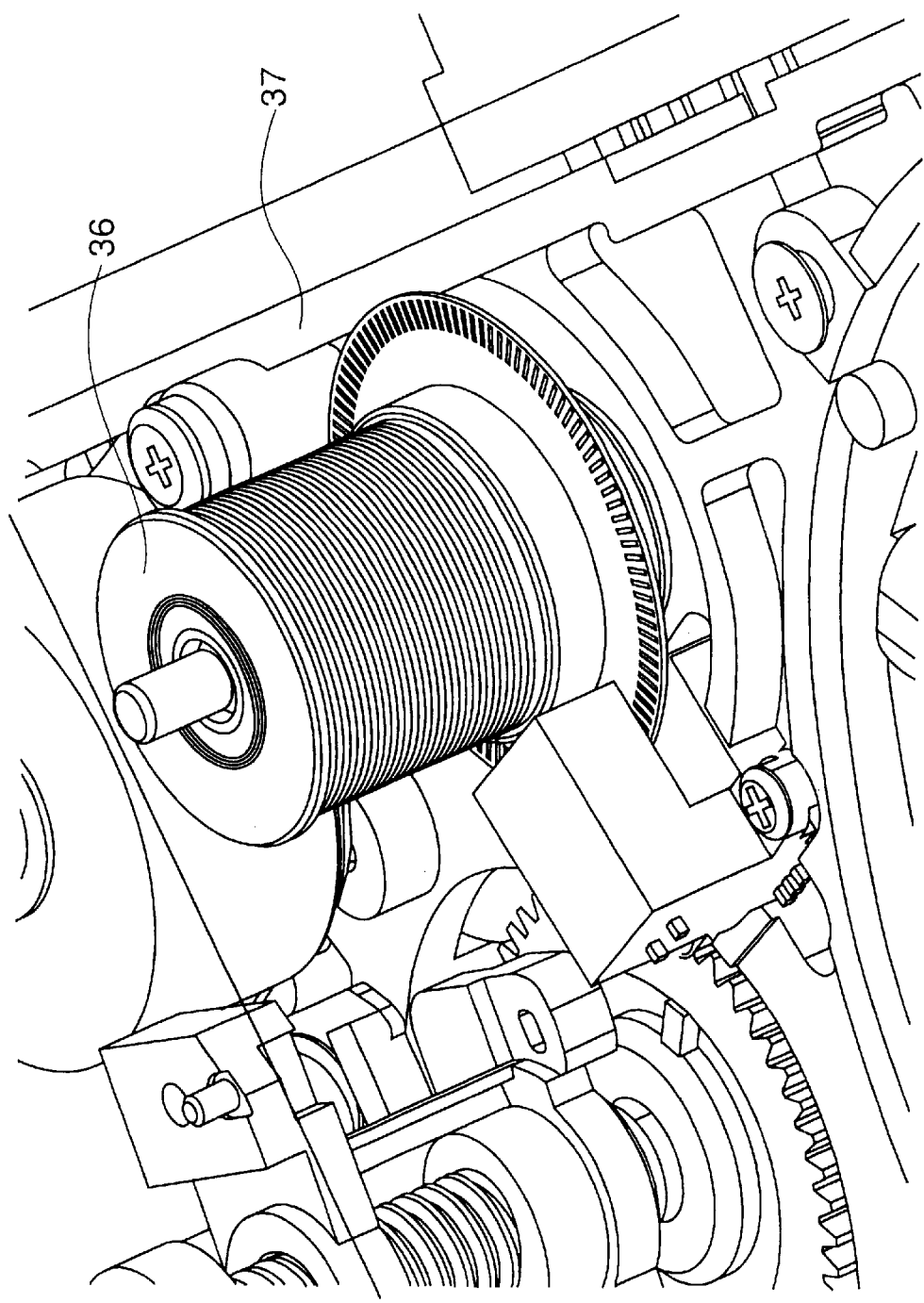
FIG. 4 is a perspective view showing an encoder used in the tape drive illustrated in FIG. 3.
Figure 5:
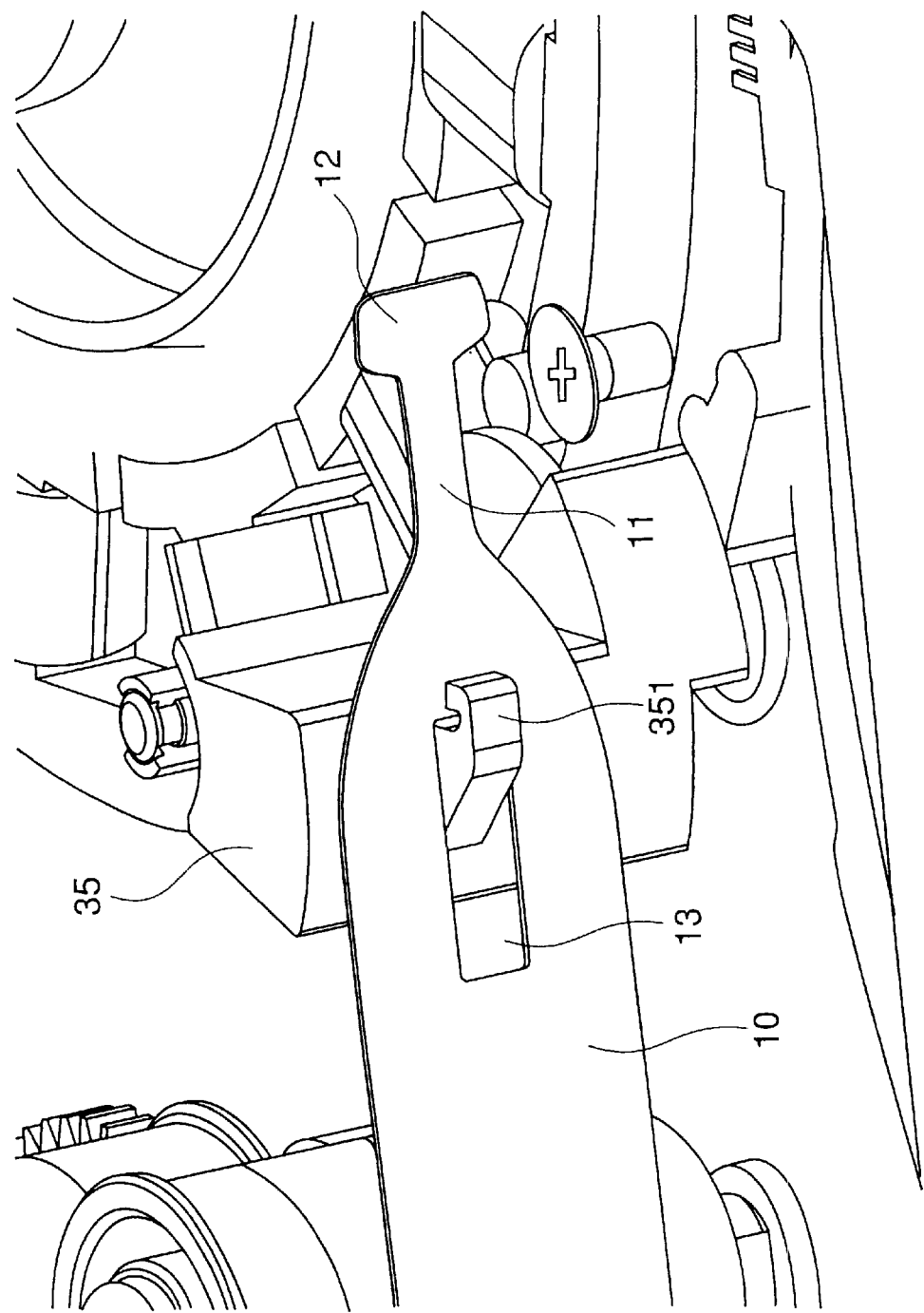
FIG. 5 is a perspective view showing the leader tape illustrated in FIG. 1 and a buckle to be fitted thereto.
Figure 7:
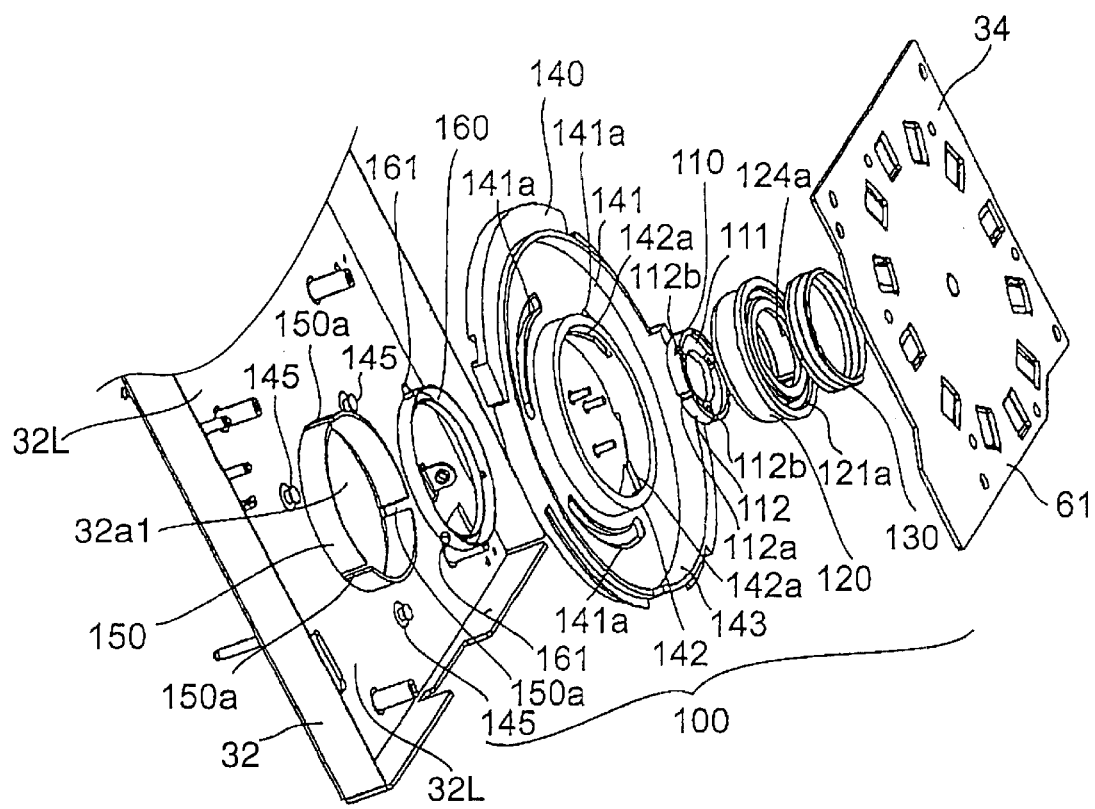
FIG. 7 is an exploded perspective view of a loading mechanism used in the tape drive in FIG. 3 as seen from a back surface (lower surface)
Figure 8:
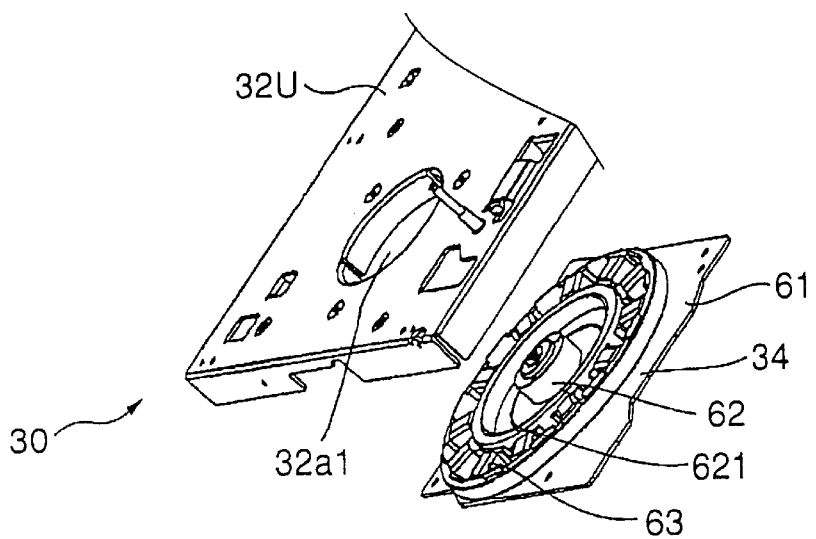
FIG. 8 is an exploded perspective view of a part of the tape drive including the loading mechanism illustrated in FIG. 7 as seen from a top surface (upper surface)
Figure 9:
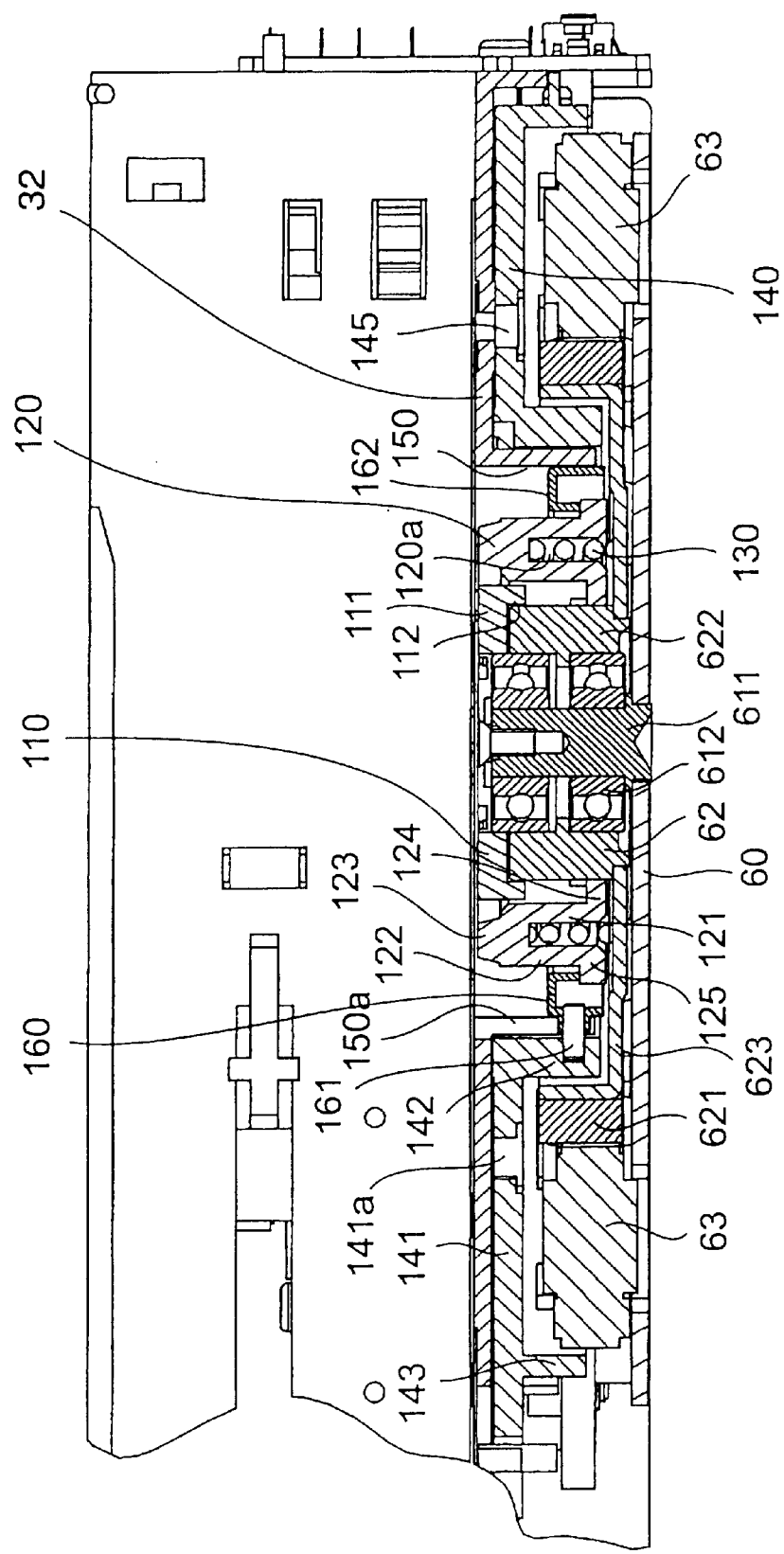
FIG. 9 is a sectional view of the loading mechanism illustrated in FIG. 7 in the state where a drive gear is retracted.
Figure 10:
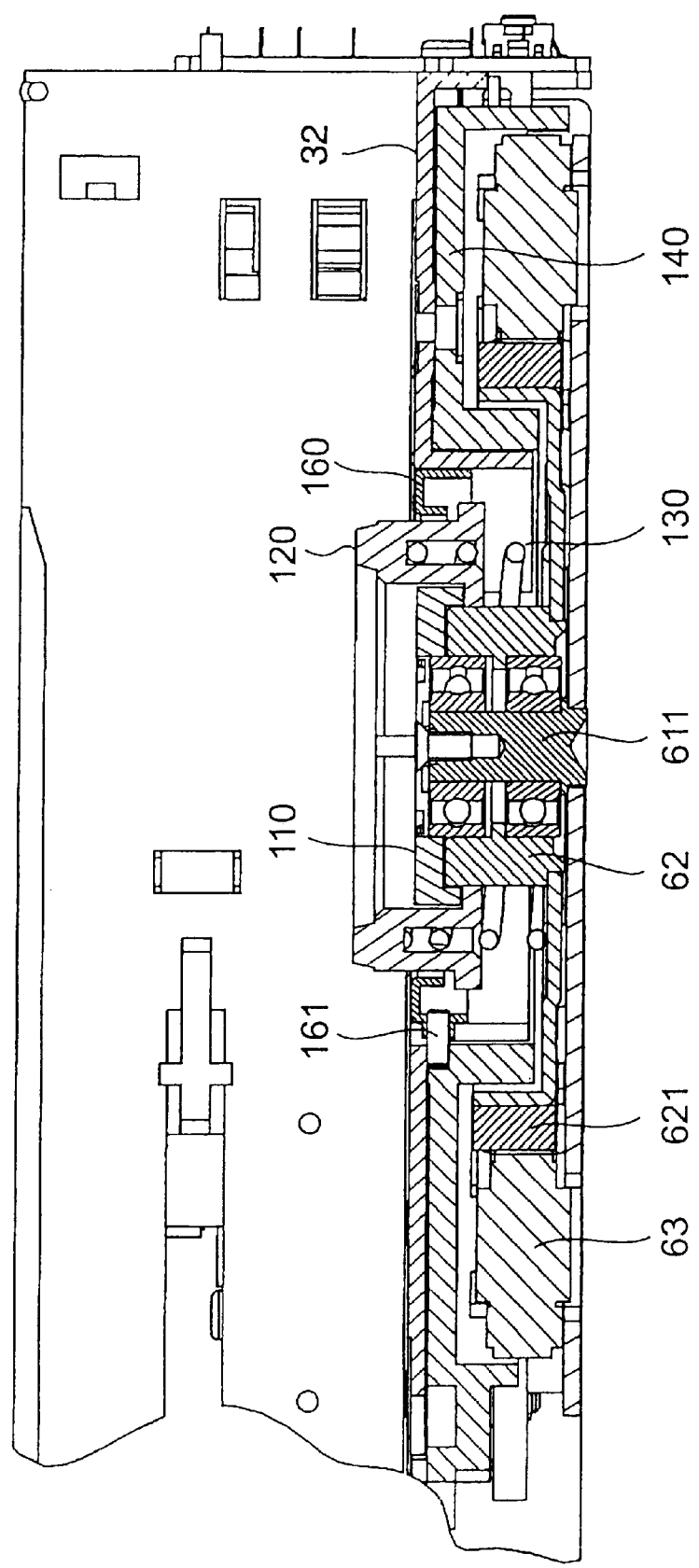
FIG. 10 is a sectional view of the loading mechanism illustrated in FIG. 7 in the state where the drive gear is operated.
Figure 11:
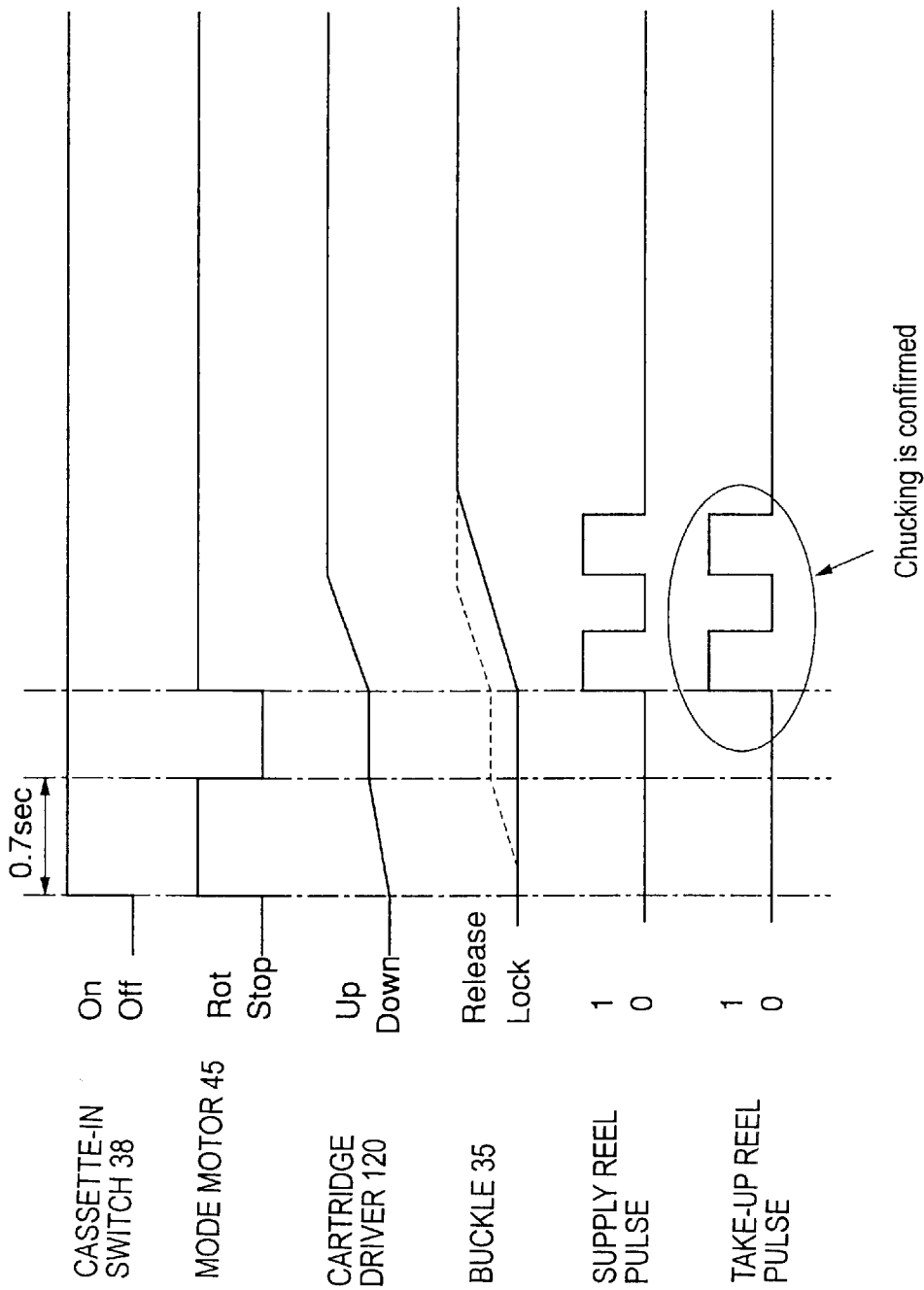
FIG. 11 is a timing chart for describing a first existing chucking confirming method.

Except the part mentioned above, the tape drive 30 is similar in structure to that illustrated in FIG. 3. For brevity of description, description of similar components will be omitted.

As described above, the existing control unit performs the time control. On the other hand, a control unit (not shown) for implementing the chucking confirming method according to this invention does not perform the time control but performs position control with reference to position detection signals from the first and the second sensors 51 and 52 as will later be described.

Figure 17:
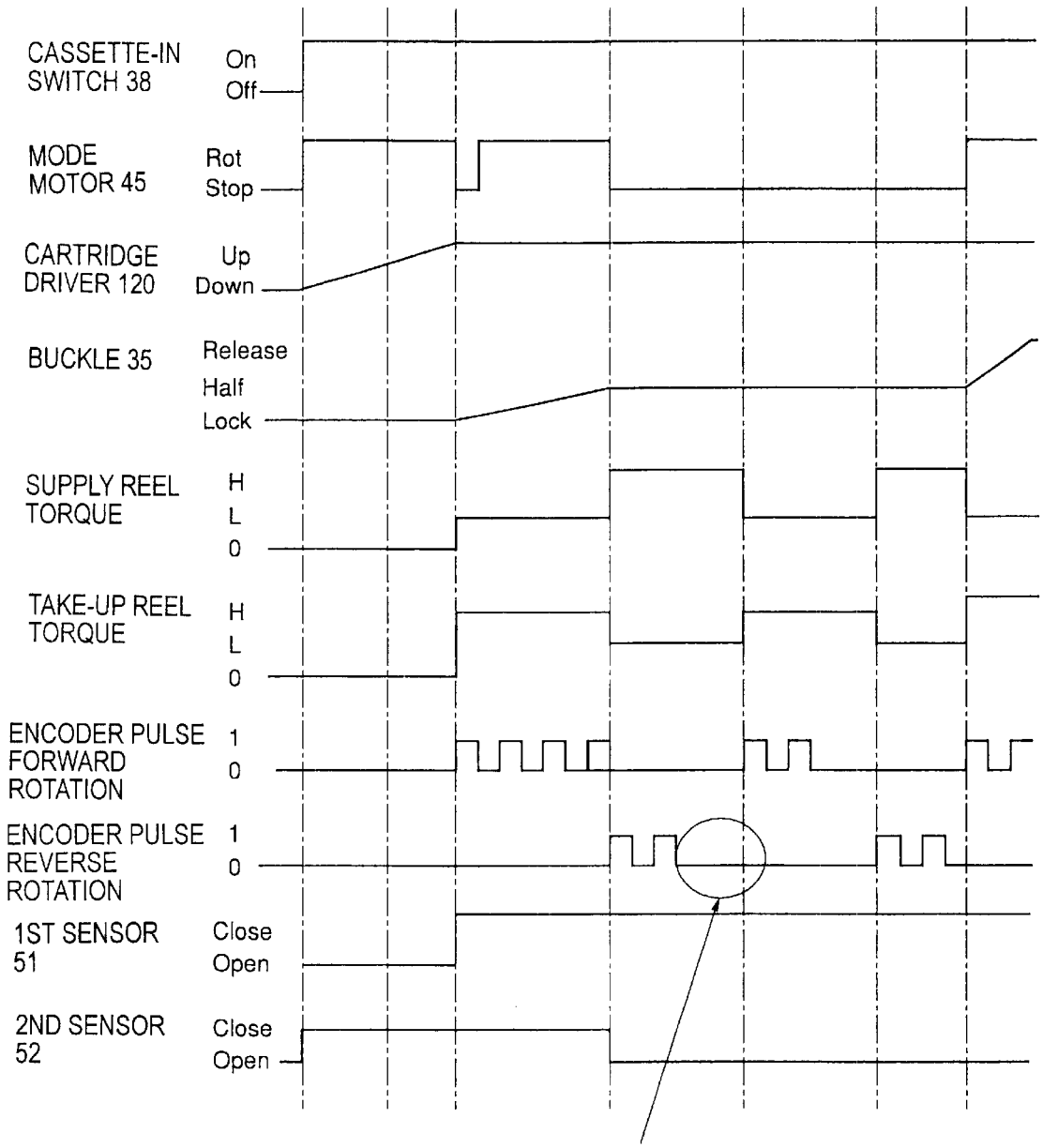
FIG. 17 is a timing chart for describing the chucking confirming method according to one embodiment of this invention.
Figure 18A:
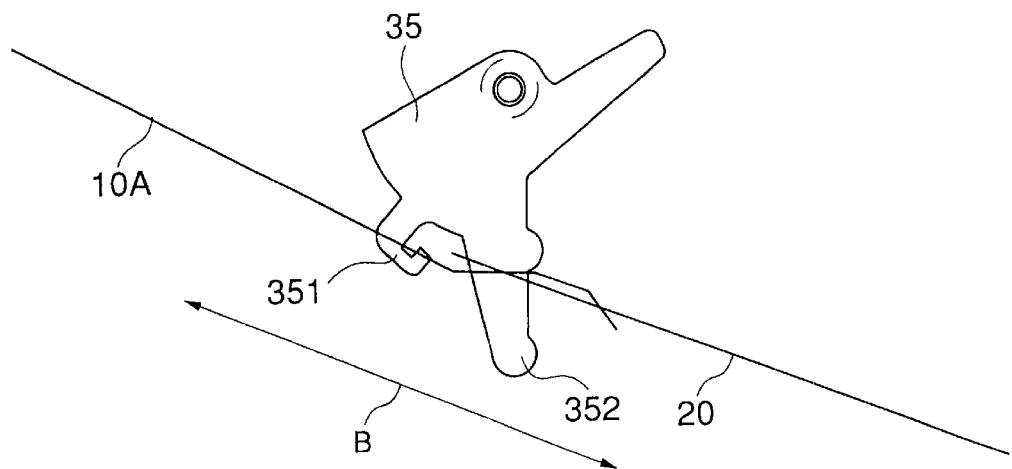
FIGS. 18A and 18B are views showing a positional relationship of a buckle for describing the chucking confirming method according to one embodiment of this invention.
Figure 18B:
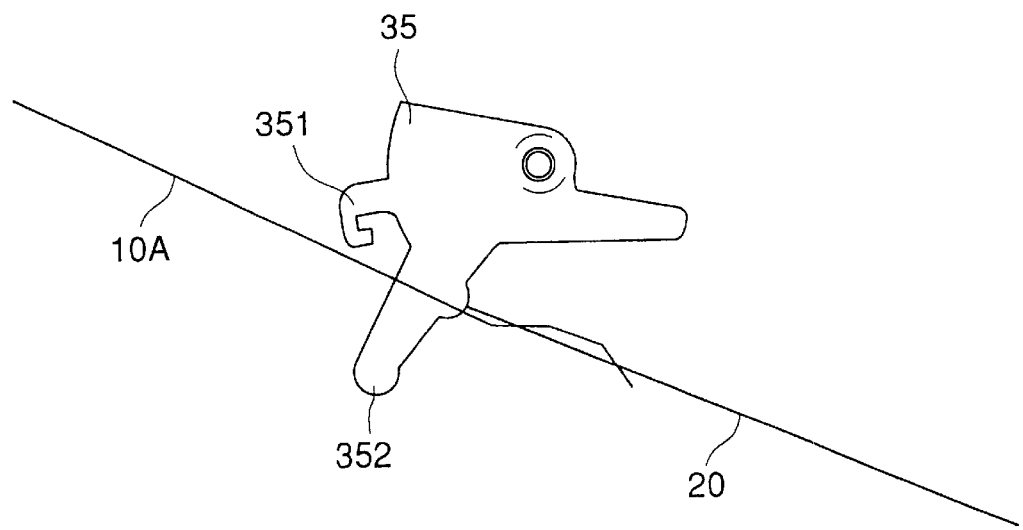

Hereinafter, referring to FIGS. 17, 18A, and 18B, description will be made of the chucking confirming method according to one embodiment of this invention. FIG. 17 is a timing chart for describing the chucking confirming method according to this embodiment. FIGS. 18A and 18B are views showing a positional relationship of the buckle for describing the chucking confirming method according to this embodiment.

In FIG. 17, a top (first) line represents the state of a cassette-in switch 38. A second line represents the rotation state of a mode motor 45. A third line represents an elevation state of the cartridge driver 120. A fourth line represents the state of the buckle 35. A fifth line represents a torque of a supply reel motor 34 for driving and rotating a supply reel. A sixth line represents a torque of a take-up reel motor 33 for driving and rotating a take-up reel 31. A seventh line represents pulses (forward rotation pulses) produced by an encoder 37 when guide rollers 36 perform forward rotation. An eighth line represents pulses (reverse rotation pulses) produced by the encoder 37 when the guide rollers 36 perform reverse rotation. A ninth line represents an open/close (on/off) state of the first sensor 51. A tenth line represents an open/close (on/off) state of the second sensor 52.

FIG. 18A shows the state where chucking is confirmed with the buckle 35 put in the half state. FIG. 18B shows the state where the buckle 35 is operated after confirming the chucking and the take-up leader tape 10A (FIG. 15) is disengaged from the buckle 35. It is noted here that the chucking state of a supply leader tape 20 and the take-up leader tape 10A immediately after the tape cartridge is inserted into the tape drive 30 is similar to that illustrated in FIG. 12A.

When the tape cartridge is loaded in the tape drive 30, the cassette-in switch 38 is turned from the off state (FIG. 6B) into the on state (FIG. 6C) (see the first line in FIG. 17). At this time, the first sensor 51 is in the opened state (on state) while the second sensor 52 is in the closed state (off state) (see the ninth and the tenth lines in FIG. 17).

Figure 2:
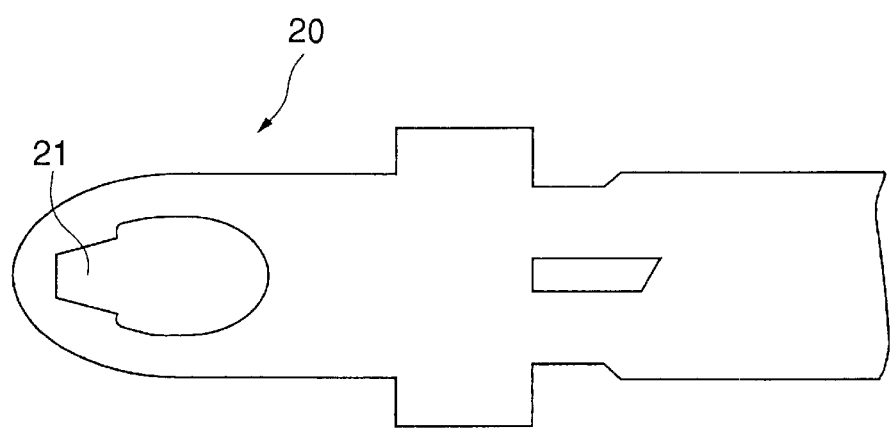
FIG. 2 is a plan view showing an end portion of a supply leader tape drawn out from a tape cartridge inserted into the tape drive.
Figure 12A:
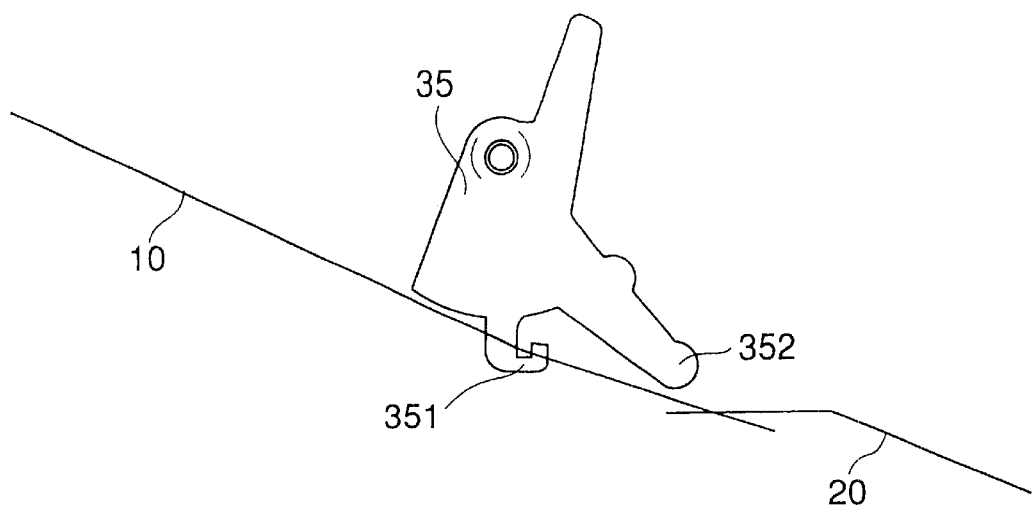
FIGS. 12A and 12B are views showing a positional relationship of the buckle for describing the first existing chucking confirming method.
Figure 12B:
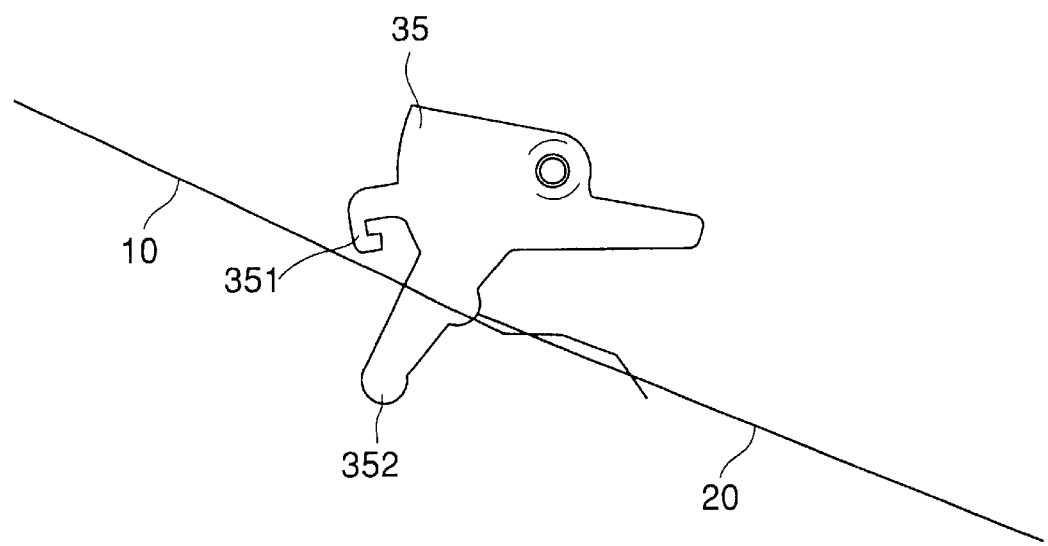
Figure 13:
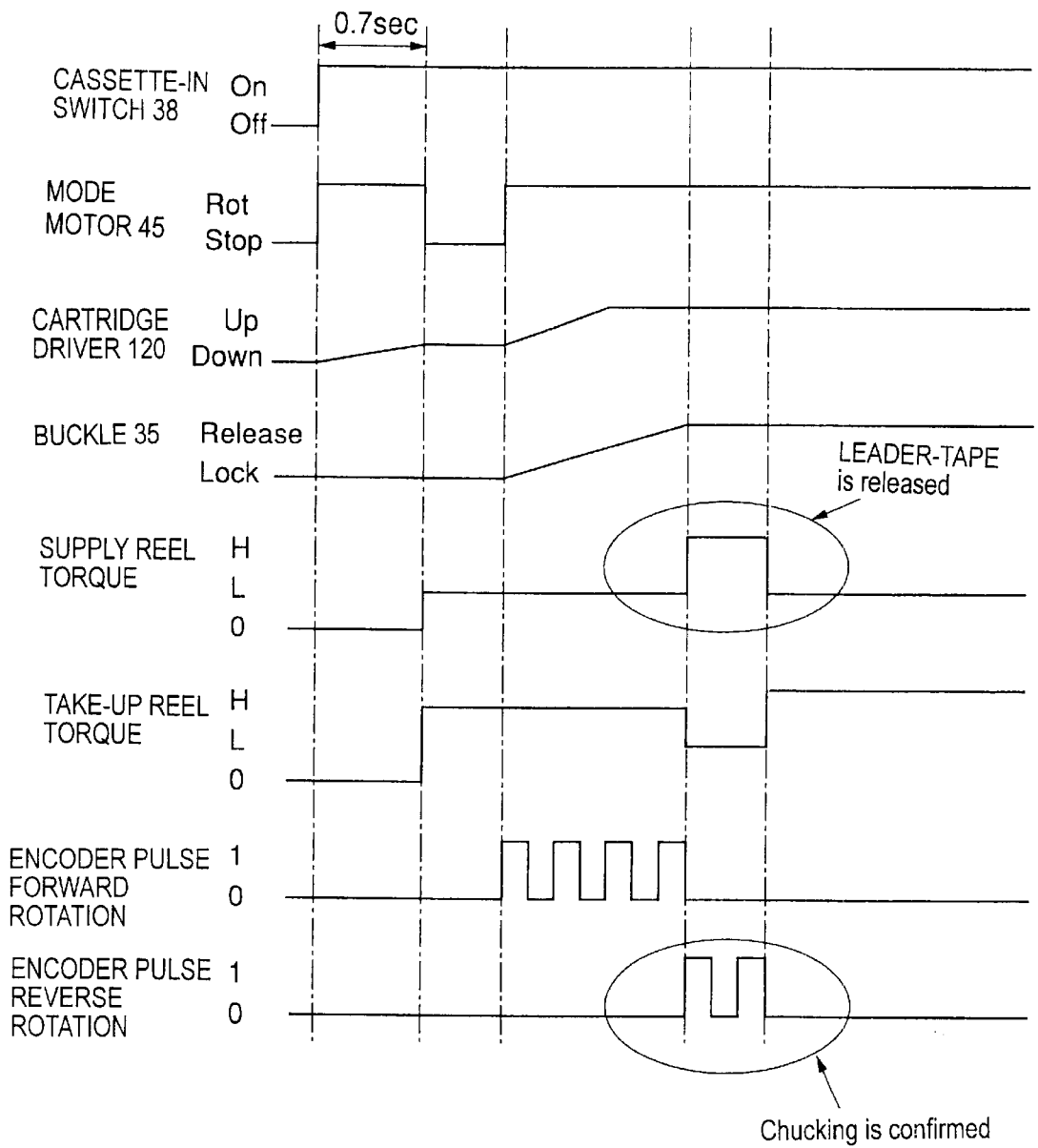
FIG. 13 is a timing chart for describing a second existing chucking confirming method.
Figure 14A:
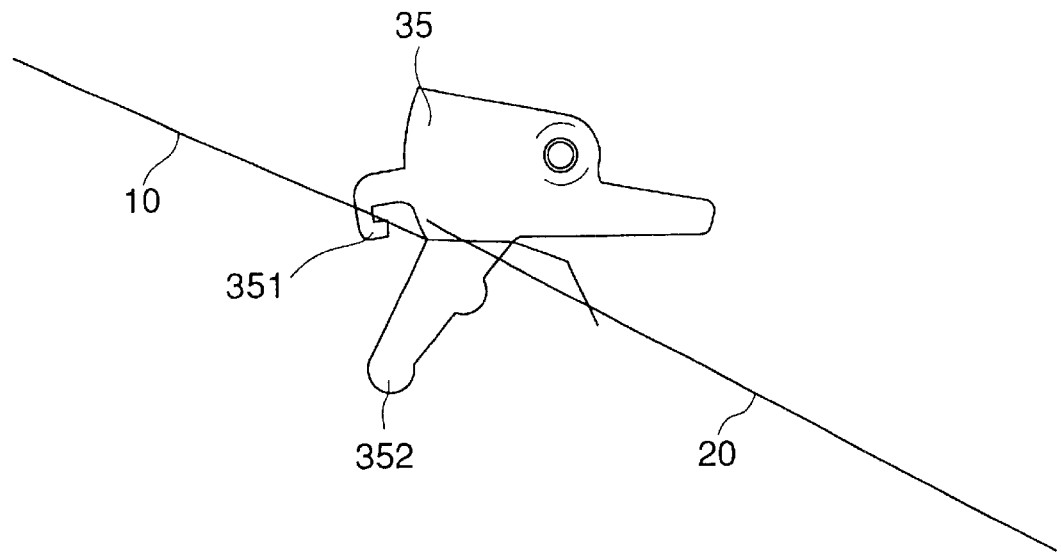
FIGS. 14A and 14B are views showing a positional relationship of the buckle for describing the second existing chucking confirming method.
Figure 14B:
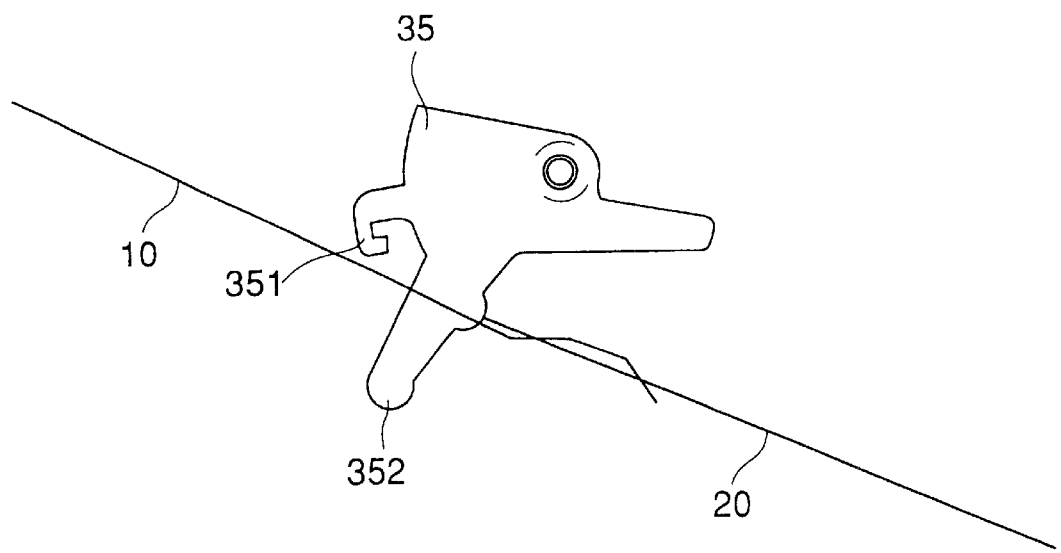

In response to the on state of the cassette-in switch 38, the control unit which is not illustrated in the figure makes the mode motor 45 rotate (see the second line in FIG. 17). In response to the rotation of the mode motor 45, the cam gear 140 is rotated so that the cartridge driver 120 is continuously elevated. At this time, as illustrated in FIG. 12A, an engaging portion 352 of the buckle 35 is not engaged with a cam portion of the cam gear 140 and a finger-like protrusion 351 of the buckle 35 is fitted into the positioning hole 13A of the take-up leader tape 10A. By a buckle arm which is not illustrated in the figure, a tab 12 (FIG. 15) of the take-up leader tape 10A is engaged with a locking hole 21 (FIG. 2) of the supply leader tape 20 to bring an end portion of the take-up leader tape 10A in engagement with the supply leader tape 20.

By continuous rotation of the mode motor 45, the cartridge driver 120 is completely elevated. The control unit detects this time instant by transition of the first sensor 51 from the opened state (on state) into the closed state (off state) (see the ninth line in FIG. 17). In response to the detection signal from the first sensor 51, the control unit stops driving of the mode motor 45 for a short time interval and then rotates it again. Simultaneously, the supply reel motor 34 and the take-up reel motor 33 are rotatably driven at a low torque and a high torque, respectively (see the fifth and the sixth lines in FIG. 17). Thus, the tape is applied with back tension. At this time, the slack of the supply leader tape 20 is removed.

Following the rotation of the mode motor 45, the engaging portion 352 of the buckle 35 is engaged with the cam portion of the cam gear 140 so that the buckle 35 is rotated (driven) clockwise (see the fourth line in FIG. 17). In this state, the supply reel is given a torque weaker than that of the take-up reel 31. Therefore, the supply leader tape 20 (FIG. 2) is pulled out from the tape cartridge. Inasmuch as both of the supply reel and the take-up reel are driven prior to the mode motor 45, the take-up leader tape 10A is prevented from being released from the buckle 35. At this time, the encoder 37 produces the forward rotation pulses (see the seventh line in FIG. 17).

By continuous rotation of the mode motor 45, the buckle 35 is put into the half state. The control unit detects this time instant by transition of the second sensor 52 from the closed state (off state) into the opened state (on state) (see the tenth line in FIG. 17). The above-mentioned state is illustrated in FIG. 18A.

In response to the detection signal from the second sensor 52, the control unit stops the driving of the mode motor 45 for a short time interval and then rotate it. Simultaneously, the supply reel motor 34 is driven at a torque stronger than that of the take-up reel motor 33 (see the fifth and the sixth lines in FIG. 17). Consequently, the supply leader tape 20 is taken up by the supply reel (rewound). At this time, as illustrated in FIG. 18A, the finger-like protrusion 351 of the buckle 35 is fitted into the positioning hole 13A of the take-up leader tape 10A. If the chucking is properly carried out, the encoder 37 produces the reverse rotation pulses (see the eighth line in FIG. 17). As described above, inasmuch as the finger-like protrusion 351 of the buckle 35 is fitted into the positioning hole 13A of the take-up leader tape 10A, the supply leader tape 20 can not be taken up by the supply reel. As a consequence, the encoder 37 no longer produces the reverse rotation pulses. (Torque control for the reels may be carried out by the use of the pulses of the encoder 37.)

After detecting the reverse rotation (rewinding direction) pulses from the encoder 37, the control unit again rotatably drives the supply reel motor 34 at a low torque and the take-up reel motor 33 at a high torque (see the fifth and the sixth lines in FIG. 17) to pull out the supply leader tape 20 (FIG. 2) from the tape cartridge in order to reconfirm that the chucking is properly carried out. If the chucking is properly carried out, the encoder 37 produces the forward rotation pulses (see the seventh line in FIG. 17). As described above, inasmuch as the finger-like protrusion 351 of the buckle 35 is fitted into the positioning hole 13A of the take-up leader tape 10A, the supply leader tape 20 can not be pulled out from the tape cartridge. As a result, the encoder 37 no longer produces the forward rotation pulses. (Torque control for the reels may be carried out by the use of the pulses from the encoder 37.)

After detecting the forward rotation (take-up direction) pulses from the encoder 37, the control unit drives the supply reel motor 34 at a torque stronger than that of the take-up reel motor 33 in order to reconfirm that the chucking is properly carried out (see the fifth and the sixth lines in FIG. 17). As a consequence, the supply leader tape 20 is taken up (rewound) by the supply reel. If the chucking is properly carried out, the encoder 37 produces the reverse rotation pulses (see the eighth line in FIG. 17). As described above, inasmuch as the finger-like protrusion 351 of the buckle 35 is fitted into the positioning hole 13A of the take-up leader tape 10A, the supply leader tape 20 can not be taken up by the supply reel. As a consequence, the encoder 37 no longer produce the reverse rotation pulses. (Torque control for the reels may be carried out by the use of the pulses from the encoder 37.)

Thus, according to this invention, the forward and the reverse rotation pulses produced by the encoder 37 are detected a plurality of times so that whether or not the chucking is properly carried out is reliably reconfirmed. In other words, as depicted by an arrow B in FIG. 18A, each of the rewinding and the take-up operations of the tape is carried out at least once.

After reliably reconfirming that the chucking is properly carried out, the control unit rotatably drives the mode motor 45 and rotatably drives the supply reel motor 34 at a low torque and the take-up reel motor 33 at a high torque (see the second, the fifth, and the sixth lines in FIG. 17). In other words, the tape is applied with back tension. By the rotation of the mode motor 45, the buckle 35 is further rotated (driven) clockwise (see the fourth line in FIG. 17). Therefore, the take-up leader tape 10A is released from the buckle 35. This state is illustrated in FIG. 18B.

Thereafter, the take-up operation of the tape is started.

As is obvious from the foregoing description, it is reconfirmed in this embodiment whether or not the take-up leader tape 10A (FIG. 15) and the supply leader tape 20 (FIG. 1) are properly chucked. Therefore, even if the supply leader tape 20 is torn off or if only one of the protrusions of the tab 12 of the take-up leader tape 10 is engaged with (inserted in) the locking hole 21 of the supply leader tape 20, mis-chucking can be detected.

Even if the chucking between the take-up leader tape 10A and the supply leader tape 20 is released, the take-up leader tape 10A is not disengaged from the buckle 35. Therefore, retry is possible.

Although this invention has been described so far in conjunction with the preferred embodiment, it will readily be understood that this invention is not restricted to the above-mentioned embodiment. For example, the number of times of confirmation about whether or not the chucking is properly carried out is at least two (the number of times of reconfirmation is at least once) and is preferably five at most.

As is obvious from the foregoing description, in this invention, reconfirmation is carried out about whether or not the leader tape is properly chucked. Therefore, mis-chucking is reliably detected. There is another advantage that, even if the chucking of the leader tape is released, retry is possible.

What is claimed is:

1. A method of confirming, upon chucking a supply leader tape and a take-up leader tape when a cartridge is inserted into a drive, that the chucking is properly carried out, the chucking being carried out using a buckle having a finger-like protrusion to be fitted to a positioning hole of said take-up leader tape and by engaging a tab of said take-up leader tape having one end connected to a take-up reel with a locking hole of said supply leader tape drawn out from said cartridge, said method comprising:

confirming whether or not the chucking is properly carried out; and reconfirming whether or not the chucking is properly carried out, said reconfirming being carried out at least once;

wherein said confirming comprises:

completely elevating a cartridge driver after said cartridge is inserted into said drive to engage said cartridge driver with a supply tape reel in said cartridge;

judging, with reference to position detection signals from first and second sensors, that said cartridge driver is completely elevated;

driving said buckle from a locked state into a half state where said finger-like protrusion is kept fitted into said positioning hole and simultaneously driving a supply reel motor and a take-up reel motor with said supply tape reel being given a lower torque than said take-up reel so that said supply leader tape and said take-up leader tape are applied with back tension to thereby remove slack in said supply leader tape;

judging, with reference to other position detection signals from said first and said second sensors, that said buckle has reached said half state; and driving said supply reel motor and said take-up reel motor with said supply tape reel being given a higher torque than said take-up reel to move said supply leader tape and said tape-up leader tape in a rewinding direction;

wherein said reconfirming comprises:

driving, after rewinding direction pulses are detected from an encoder when said supply leader tape and said take-up leader tape are moved in said rewinding direction, said supply reel motor and said take-up reel motor with said supply tape reel being given a lower torque than said take-up reel to move said supply leader tape and said take-up leader tape in a take-up direction; and driving, after take-up direction pulses are detected from said encoder when said supply leader tape and said take-up leader tape are moved in said take-up direction, said supply reel motor and said tape-up reel motor with said supply tape reel being given a higher torque than said take-up reel to move said supply leader tape and said take-up leader tape in said rewinding direction;

wherein said method further comprises driving, after reconfirming that the chucking is properly carried out, said buckle from said half state to a released state where said take-up leader tape is released, and simultaneously driving said supply reel motor and said take-up reel motor to carry out a take-up operation with said supply tape reel being given a lower torque than said take-up reel so that said supply leader tape and said take-up leader tape are applied with back tension; and wherein the positioning hole of said take-up leader tape comprises an elongated hole such that, when said buckle is in said half state, said supply leader tape and said take-up leader tape are allowed to be moved in said rewinding direction and said take-up direction.

* * * * *